(12) United States Patent
Quach et al.

(10) Patent No.: US 6,397,301 B1
(45) Date of Patent: May 28, 2002

(54) PREVENTING ACCESS TO SECURE AREA OF A CACHE

(75) Inventors: Nhon T. Quach, San Jose; Gary Hammond, Campbell; Kin-Yip Liu, Santa Clara, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,973

(22) Filed: Dec. 29, 1999

(51) Int. Cl.⁷ .............................................. G06F 12/00
(52) U.S. Cl. ....................................... 711/138; 711/163
(58) Field of Search .................................. 711/163, 138

(56) References Cited

U.S. PATENT DOCUMENTS

| | | | | |
|---|---|---|---|---|
| 4,357,656 A | * | 11/1982 | Saltz et al. ................. 364/200 |
| 4,740,889 A | * | 4/1988 | Motersole et al. .......... 364/200 |
| 5,210,850 A | * | 5/1993 | Kelly et al. .................. 395/425 |
| 5,224,166 A | * | 6/1993 | Hartman, Jr. ................. 380/50 |
| 5,247,639 A | * | 9/1993 | Yamahata .................... 395/425 |
| 5,408,636 A | * | 4/1995 | Santeler ...................... 395/425 |
| 5,551,004 A | * | 8/1996 | McClure ..................... 395/465 |
| 5,586,293 A | * | 12/1996 | Baron et al. ................. 395/445 |
| 5,724,550 A | * | 3/1998 | Stevens ....................... 395/473 |
| 5,761,719 A | * | 6/1998 | Mahin et al. ................ 711/139 |
| 5,900,014 A | * | 5/1999 | Bennett ....................... 711/138 |
| 6,044,478 A | * | 3/2000 | Green .......................... 714/42 |
| 6,131,155 A | * | 10/2000 | Alexander et al. .......... 712/207 |
| 6,138,216 A | * | 10/2000 | Harvey ........................ 711/139 |

* cited by examiner

Primary Examiner—Kevin Verbrugge
(74) Attorney, Agent, or Firm—Kenyon & Kenyon

(57) ABSTRACT

Information in a cache that is coupled to a processor is secured by recording the location in the cache of information that is being secured, and performing a cache avoidance procedure instead of allowing the instruction to access the area of the cache containing the information being secured.

27 Claims, 5 Drawing Sheets

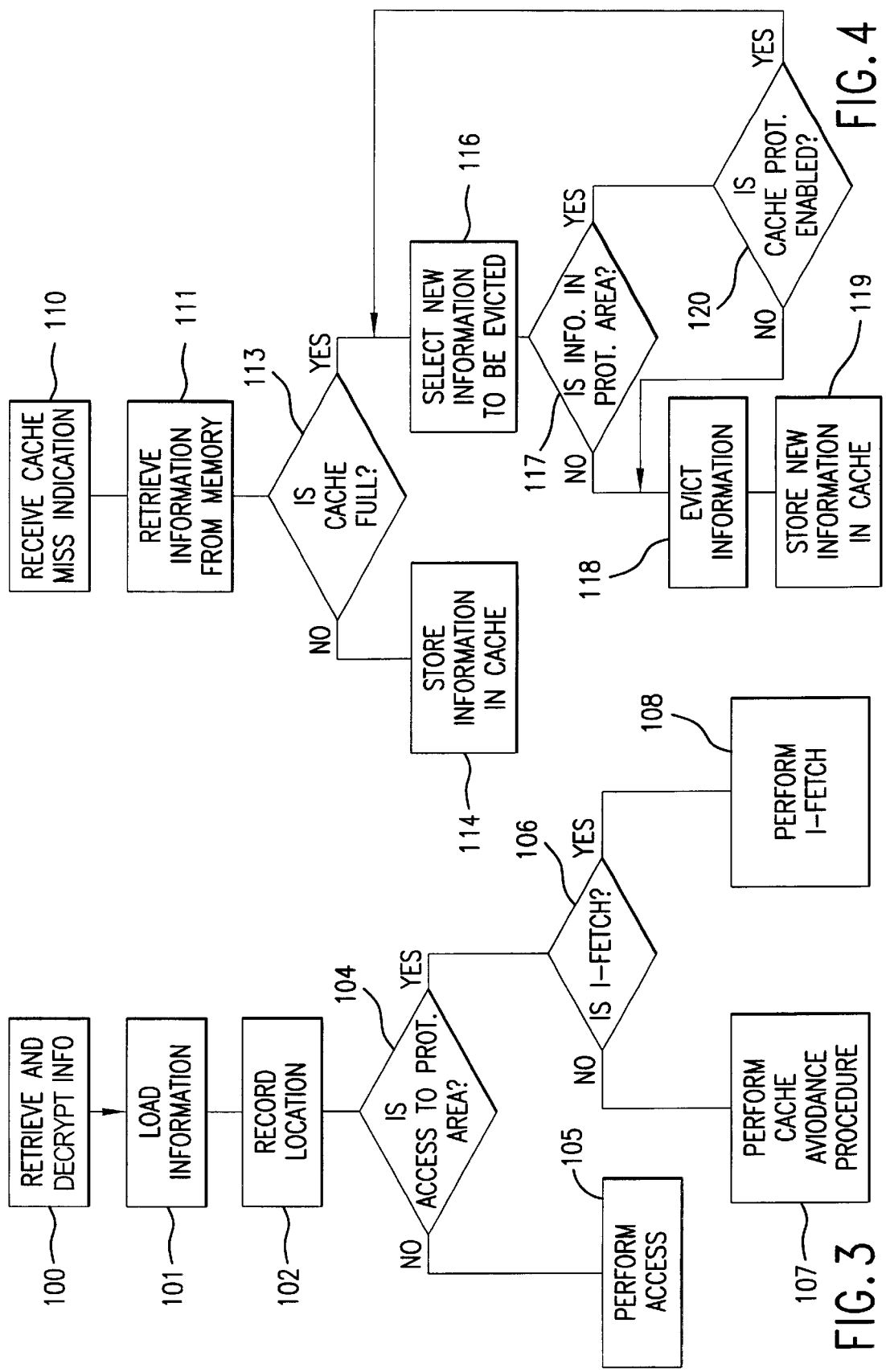

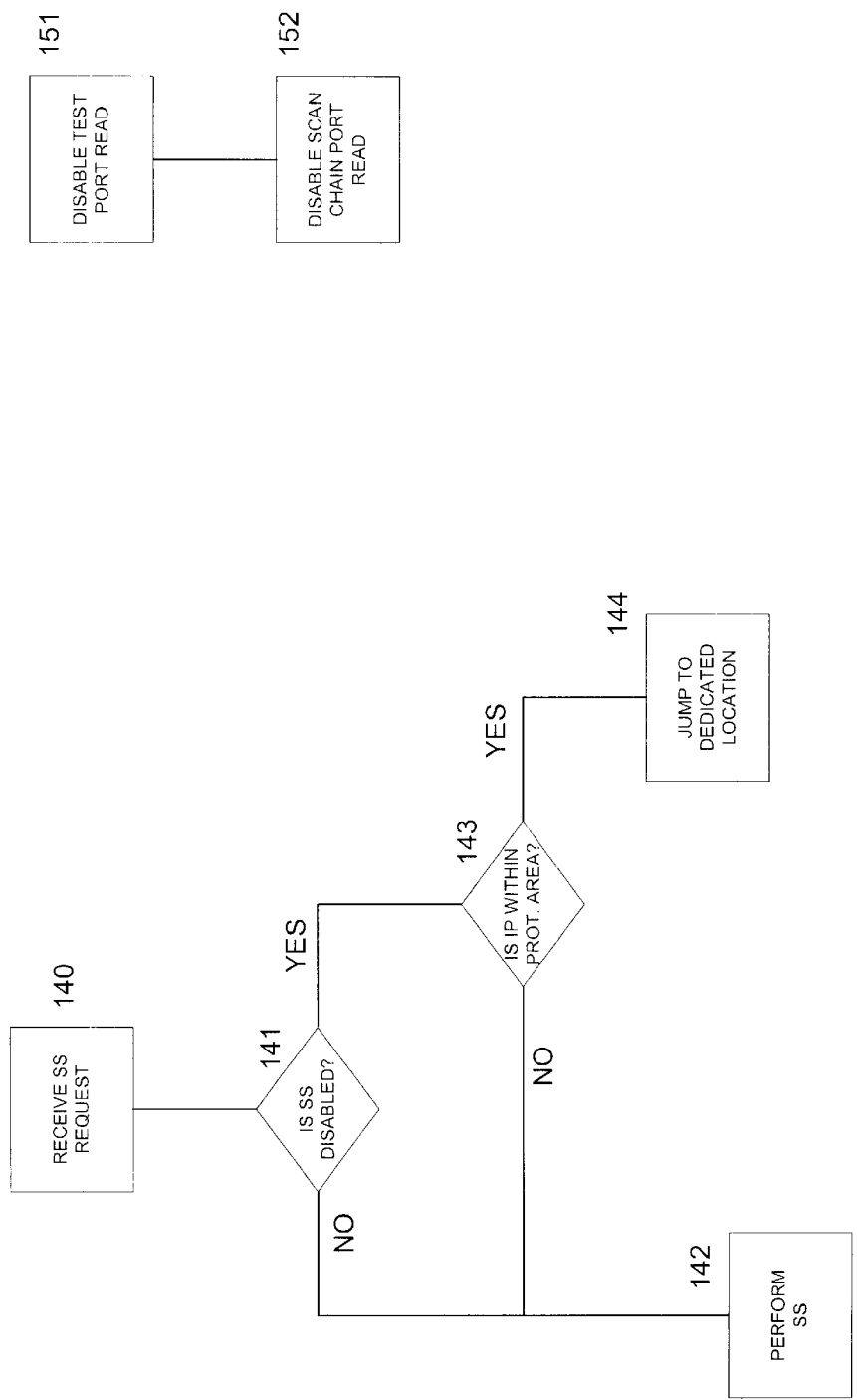

PREVENTING ACCESS TO SECURE AREA OF A CACHE

FIELD OF THE INVENTION

Embodiments of the present invention provide an apparatus and method for securing information in a cache. More particularly, embodiments of the present invention provide an apparatus and method for securing information in a processor cache from unauthorized accesses. once the information has been loaded into the cache.

BACKGROUND OF THE INVENTION

It is sometimes necessary to prevent unauthorized users from determining the contents of information stored in a computer system. For example, a computer may contain proprietary data or software. It is desirable to prevent a user from making unauthorized copies or determining the contents of such information. This concern is especially relevant where the user has physical control of the computer and/or is able to determine the program being executed by the processor.

Information in the memory of a computer system may be protected by using techniques such as encrypting the information. There are many familiar encryption algorithms. It is not practical, however, to use encryption to protect information that is stored in a cache memory. The advantage of a cache memory is that the information can be more quickly retrieved and used by the processor. Because the encrypted information would have to be un-encrypted before it is used by the processor, encrypting the information in the cache would slow down the processor and undermine the fast access benefits of the cache.

If left unencrypted, the contents of information stored in a cache may be determined by an unauthorized user. For example, a user may instruct the processor to read the information in question from the cache memory and write the information to an input/output device or other location where the user can determine the contents of the information. An unauthorized user might directly send a read command to the processor that is associated with the cache or another processor in the system may access the cache via a "snoop" operation. A "snoop" operation can occur when a processor fails to find a line in its own cache and sends the inquiry on the system bus to the main memory. In response to this inquiry, other processors must look in their own cache and, if the line is found in the other processor's cache, the line must be returned from that cache rather than from memory. In this case, the processor is said to have performed a "snoop" operation.

In addition, an unauthorized user could determine the contents of the information by doing a test port read or by executing the program in single-step mode and recording the contents of the program registers. Further, if the information in question was evicted from the cache, and thus copied back into the main memory, a user could determine the contents of the unencrypted information by using, for example, an oscilloscope. Finally, if the integrated circuit chip on which the cache resides has scan chain access, the unauthorized user could learn the contents of the protected information by reading the scan chain.

Based on the foregoing, there is a need for a method that secures the information in the cache so that unauthorized users will not be able to determine the contents of the information.

SUMMARY OF THE INVENTION

Embodiments of the present invention provide a method and apparatus for securing information in a cache that is coupled to a processor. The information is secured by recording the location in the cache of information that is being secured, and performing a cache avoidance procedure instead of allowing the instruction to access the area of the cache containing the information being secured.

BRIEF DESCRIPTION OF THE DRAWINGS

FIG. 3 shows a method for securing information in a cache according to one embodiment of the present invention.

FIG. 4 shows a method for preventing secured information from being evicted from a cache according to one embodiment of the present invention.

DETAILED DESCRIPTION

Figure 1:
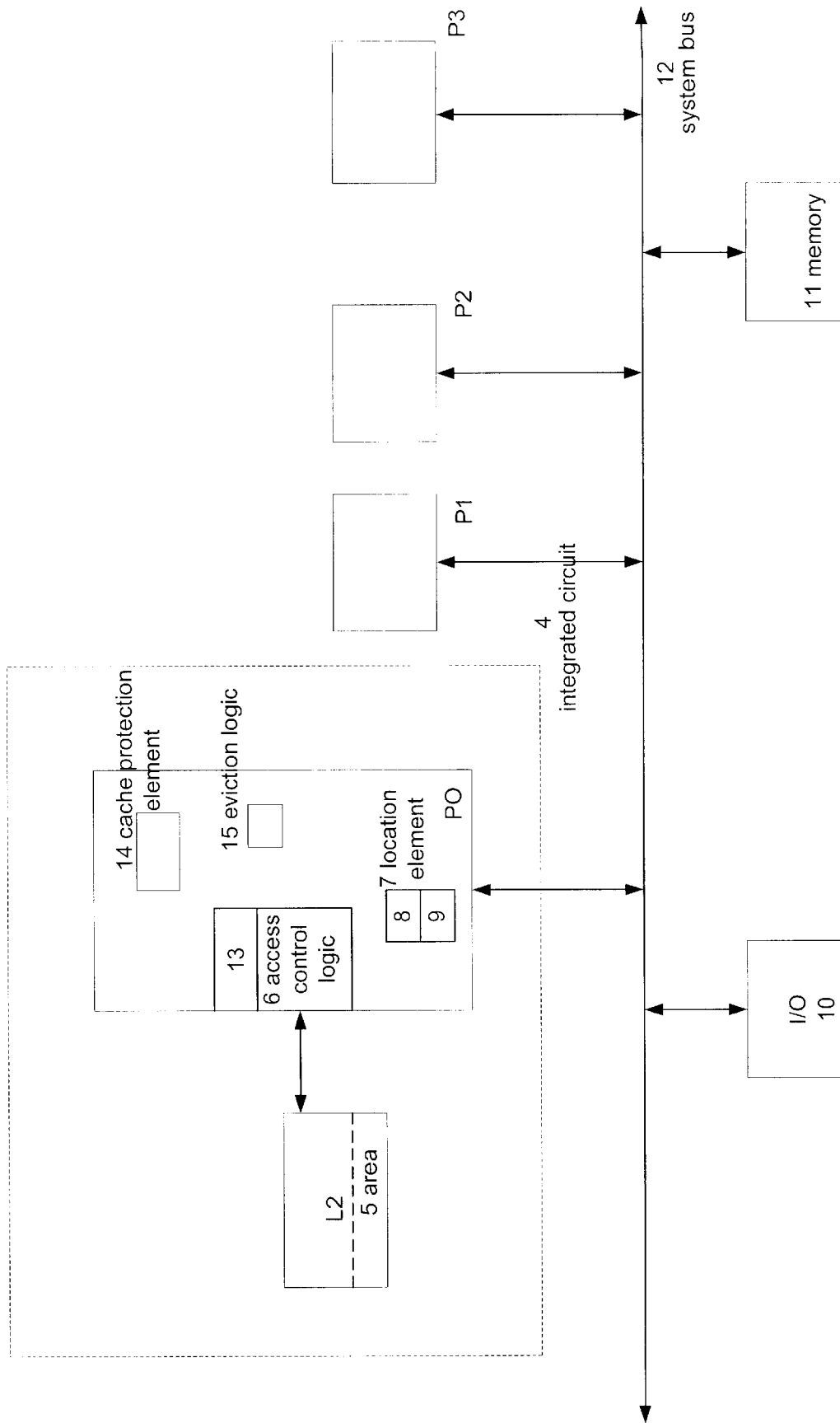
FIG. 1 shows a multi-processor computer system according to one embodiment of the present invention.

FIG. 1 shows a multi-processor computer system according to one embodiment of the present invention. A processor P0 is coupled to a system bus 12. As used herein, the term "coupled" means directly or indirectly connected. Thus, A is coupled to B if directly connected to B, and/or if A is directly connected to C, and,C is directly connected to B. Processor P0 can be a general purpose microprocessor, such as an Intel Pentium III processor, or may be an application specific processor. System bus 12 may use any configuration.

Additional processors P1, P2 and P3 are also coupled to system bus 12. Processors P1, P2 and P3 may or may not be the same type of processor as processor P0. Also coupled to system bus 12 are I/O device 10 and main memory 11. In this embodiment, main memory 11 is a random access memory. Processor P0 can communicate with processors P1, P2, and P3 through system bus 12. Processor P0 can also retrieve information or write information to I/O device 10 and memory 11 through system bus 12. As used herein, the term "information" means any type of data or instructions that may be stored in a computer memory and processed by a computer processor.

In this embodiment, processor P0 is mounted on integrated circuit package 4. A processor cache L2 is coupled to processor P0 and also mounted on integrated circuit package 4. In alternate embodiments, cache L2 may not be located on the same integrated circuit package as processor P0. Cache L2 may be any type of cache. Cache L2 contains a plurality of cache lines, each of which may be read by or written from processor P0. As shown in FIG. 1, cache L2 may have an area 5 that contains information being secured. Area 5 may be of any size, and the size of area 5 may vary over time depending upon the needs of processor P0. Although only one protected area 5 that contains information being secured is shown in FIG. 1, in other embodiments cache L2 may contain two or more such areas. Information to be protected may be initially stored in main memory 11 in an encrypted form. The information may be retrieved from main memory and decrypted by processor P0, after a reset command, and stored in cache L2 in decrypted form.

Processor P0 contains access control logic 6 that is used to control access to cache L2. A processor can access a cache in one of two ways: it can execute an instruction that accesses the cache (e.g., read or write) or it can fetch an instruction from the cache. Access control logic 6 controls the reading of information from cache L2, the writing of information to cache L2, and the fetching of instructions from cache L2. Information is read from the cache when the processor executes an instruction that causes the processor to request that the cache send information from a certain location in the cache to the processor. Similarly, information is written to the cache when the processor executes an instruction that causes the processor to send to the cache information to be stored in a certain location in the cache. Different processors may use a different terminology for the read and write instructions. For example, "store" may be used instead of "write" and "load" instead of "read." As used herein, a processor "executes an instruction that accesses the cache" when the processor executes a read instruction, a write instruction, or an instruction that has a similar effect as a read or write instruction.

In addition, the processor may also access the cache by fetching an instruction from the cache during the instruction cycle. After a processor fetches an instruction from the cache, the only thing the processor can do with the instruction is execute the instruction. An unauthorized user cannot learn the contents of an instruction by fetching an instruction and executing the instruction during normal operation. Thus, as used herein, the fetching of an instruction is different from the "execution of an instruction that accesses the cache."

Access control logic 6 contains cache protection logic 13 that protects the information being secured in the cache from unauthorized access. If the processor attempts to execute an instruction that accesses the area of the cache that contains information being secured, cache protection logic 13 will perform a cache avoidance procedure instead of allowing the instruction to access the area of the cache containing the information being secured. For example, cache protection logic 13 may cause a cache miss indication or indicate that an error has occurred. When a cache miss is indicated, the instruction may access another memory instead of the cache. Cache protection logic 13 will permit the execution of instructions that access areas of the cache that do not contain the information being secured. Further, cache protection logic 13 will allow an instruction to be fetched from any area in the cache. For the reason discussed above, an instruction fetch from the cache is always authorized. In a one embodiment, cache protection logic 13 prevents other processors, such a processors P1, P2 of P3, from "snooping" the protected area of the cache. For example, a "snoop" may occur when processor P1 fails to find a line is its own processor cache (not shown). In this case, processor P1 may send the inquiry on the system bus to the main memory 11. In response to this inquiry, other processors such as processor P0 must look in their own cache. If processor P0 finds the line in cache L2, processor P0 normally would return the line from cache L2. In one embodiment, cache protection logic 13 prevents snoops from occurring and, in the example above, would prevent processor P0 from returning data from the protected area of cache L2.

Processor P0 also contains a location element 7 that stores the address in the cache of the information being secured. Location element 7 may contain a first location register 8 and second location register 9, the first location register 8 storing the start address of the information being secured and the second location register 9 storing the size of the information being secured. In another embodiment, the second location register 9 stores the end address of the information being secured. Cache protection logic 13 uses location element 7 to determine if an attempted access to the cache is to the area that contains the information being secured.

Processor P0 further may include a cache protection enabled element 14 and eviction logic 15. Cache protection enabled element 14 is, for example, a one-bit register. In one embodiment, cache protection enabled element 14 is set by logic in processor P0 (and thus cache protection is enabled) when the cache L2 contains information that is being secured. Processor P0 may unset cache protection enabled element 14 and clear cache L2 when the cache no longer contains information being secured. In this embodiment, cache protection logic 13 will permit the execution of an instruction that accesses the cache, even if the access is to an area of the cache that contains information being secured, when cache protection enabled element 14 in not set. In one embodiment, cache protection is disabled only when cache protection enabled element 14 contains a secret code. This code may be an encrypted password that is stored in system memory 11 and that may be decrypted by processor P0. In one embodiment, cache protection enabled element 14 may be set when the information being secured is loaded and may only be cleared by a hardware reset.

Eviction logic 15 is used by the processor, when evicting information from the cache, to determine which information it will evict from the cache. Eviction logic 15 may operate according to one of many known algorithms. In one embodiment of this invention, eviction logic 15 will not select information to be evicted if the information is located in the area of the cache that contains information being secured. In a further embodiment, eviction logic 15 will select information to be evicted from any area of the cache if cache protection is not enabled. Eviction logic 15 may check cache protection enabled element 14 to determine if cache protection is enabled or it may check a separate cache protection element (not shown) that is maintained in the same way as cache protection enabled element 14.

Figure 2:
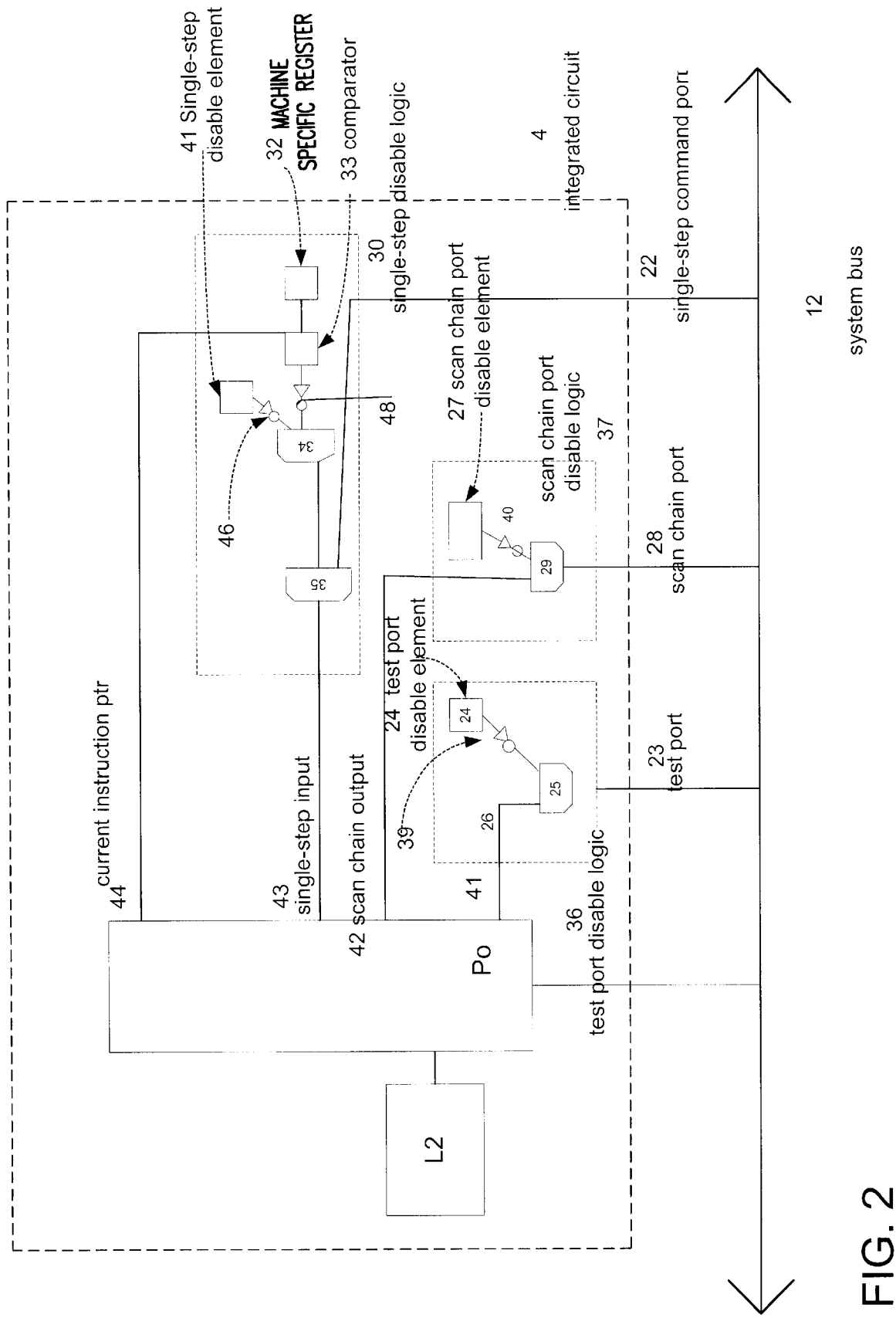
FIG. 2 shows an apparatus for disabling test port read, scan chain read, and single-stepping according to one embodiment of the present invention.

FIG. 2 shows an apparatus for disabling test port read, scan chain read, and single-stepping according to one embodiment of the present invention. FIG. 2 shows integrated circuit 4, processor P0 and cache L2 as discussed above with reference to FIG. 1. FIG. 2 also shows test port 23, scan chain port 28, and single-step command port 22, all of which can be accessed by a device that is outside of integrated circuit 4. In addition, test port disable logic 36, scan chain port disable logic 37, and single-step disable logic 30 are shown located on integrated circuit 4. In other embodiments, test port disable logic 36, scan chain port disable logic 37, and single-step disable logic 30 can be located off of integrated circuit 4.

A test port is used during the debugging of a processor such as processor P0. A person debugging the processor functionality may, for example, read the test port to determine the contents of processor registers. After the processor has been debugged, the test port is no longer needed. Because an unauthorized user can learn the contents of information in the cache via the test port, one embodiment of the present invention disables reading from the test port. Test port disable logic 36 contains test port disable element 24 and AND gate 25. Test port disable element 24 is, for example, a one-bit register. To disable reading from the test port, test port disable element 24 is set to logical one. Test port disable element 24 will then remain set, even after the power is turned off. In one embodiment, test port disable element 24 may be set by software during system initialization and cannot be reset except by a hardware reset. The output of test port disable element 24 is routed through an inverter 39 and to an input of AND gate 25. The test port output 41 of processor P0 is coupled to an input of AND gate 25. When test port disable element 24 is set, inverter 39 will input a logical zero to AND gate 25. In this situation, the output of AND gate 25, and thus the output on test port 23, will always be logical zero regardless of the value of test port output 41. When test port disable element 24 is unset, inverter 39 will input a logical one to AND gate 25. The output of AND gate 25 will then reflect the value at test port output 41.

An unauthorized user can learn the contents of information in the cache via the scan chain port, and for this reason one embodiment of the present invention disables reading from the scan chain port 28. Scan chain port disable logic 37 contains scan chain port disable element 27 and AND gate 29. Scan chain port disable element 27 is, for example, a one-bit register. To disable reading from the scan chain port, scan chain port disable element 27 is set to logical one. Scan chain port disable element 27 will then remain set, even after the power is turned off. In one embodiment, scan chain port disable element 27 may be set by software during system initialization and cannot be cleared except by a hardware reset. The output of scan chain disable element 27 is routed through an inverter 40 and to an input of AND gate 29. The scan chain port output 42 of processor P0 is coupled to an input of AND gate 29. When scan chain disable element 27 is set, inverter 40 will input a logical zero to AND gate 29. In this situation, the output of AND gate 29, and thus the output on test port 28, will always be logical zero regardless of the scan chain port output 42 of processor P0. When scan chain port disable element 27 is unset, line 45 will input a logical one to AND gate 29. The output of AND gate 29, and thus the output of scan chain port 28, will then reflect the value at scan chain port output 42.

During debugging, a user may wish to single-step though a program that is being executed by processor P0. When a program is executed in single-step mode, the processor will execute a single line of code after it gets a command to take a "step". In single-step mode, the processor will stop after taking a step (i.e., will stop after executing an instruction). Because the processor is stopped, a user is then able to determine the contents of the registers and may infer the instruction that was just completed. While this is helpful when debugging a program, it may allow the user to determine the contents of the information being secured. To ensure that a user is not able to determine the contents of the information in the cache by single-stepping, one embodiment of the present invention disables single-stepping.

In one embodiment, single-step disable logic 30 contains single-step disable element 41, machine specific register 32, comparator 33, AND gate 34, and AND gate 35. Single-step disable element 41 may be, for example, a one-bit register. Output 44 of processor P0 contains the value of the current instruction pointer for processor P0 and may be coupled to an input of comparator 33. Machine specific register 32 contains the location in the cache of the information that is being secured. In one embodiment, machine specific register 32 contains the initial address and end address of the location in the cache containing the information being secured. In another embodiment, machine specific register contains the initial address and size of the location in the cache containing the information be secured.

The output of machine specific register 32 is input to comparator 33. Comparator 33 compares the values of the current instruction pointer to the value stored in machine specific register 32 and outputs a logical one if the instruction pointer is pointing to an instruction that is located in the area of the cache that contains the information being secured. In one embodiment, comparator 33 determines if the instruction pointer is between the initial address and end address of the location in the cache containing the, information being secured. In another embodiment, comparator 33 masks out the lower order bits of the addresses and compares the remaining bits to determine if the instruction pointer is between the initial address and end address of the location in the cache containing the information being secured. The output of inverter 48 will then be logical zero. If the instruction pointer is not pointing to an instruction that is located in area of the cache that contains the information being secured, comparator 33 will output a logical zero and the output of inverter 48 will then be logical one. The output of inverter 48 is an input to AND gate 34. Both the output of AND gate 34 and single-step mode input 22 are coupled to inputs of AND gate 35. The output of AND gate 35 is coupled to single-step input 43 of processor P0. When single-step disable element 41 is set, inverter 46 will always input a logical zero to AND gate 34. The output of AND gate 34, and thus the input to single-step input 43, will always be logical zero when single-step disable element 41 is set and the instruction pointer is pointing to an instruction that is located in the area of the cache that contains the information being secured. The output of AND gate 35 will be a logical one when single-step input 22 is a one and either the instruction pointer is not pointing to an instruction that is located in area of the cache containing the information being secured or single-step disable element 41 is not set. Only when the output of AND gate 35 is a logical one will a single-step enabled command will be sent to single-step input 43 of processor P0.

FIG. 3 shows a method for securing information in a cache according to one embodiment of the present invention. At 100, the processor retrieves encrypted information, for example from the system memory or from the system firmware area, and decrypts the information. At 101, the processor loads information being secured into an area of the cache. The processor records the location in the cache of the information being secured at 102. At 104, an attempted access to the cache is received by the processor's access control logic and the processor determines if the attempted access is to an area of the cache that contains information being secured. The attempted access may be by the processor associated with the cache (processor P0 in FIG. 1) or in an alternate embodiment the access may be by another processor (e.g., processors P1, P2 or P3 in FIG. 1). If the access is not to an area that contains information being secured, at 105 in FIG. 2 the access is performed. If the access is to an area that contains information being secured, at 106 the access control logic determines if the access is an instruction fetch. If the access is an instruction fetch, at 108 the instruction fetch is performed. If the access is not an instruction fetch, then the processor is attempting to execute an instruction that accesses the area of the cache that contains the information being secured, and at 107 a cache avoidance procedure is performed. For example, a cache miss or error may be indicated. In an alternate embodiment, the access control logic may determine if the access is an instruction fetch before determining if the access is to an area that contains information being secured.

FIG. 4 shows a method for preventing secured information from being evicted according to one embodiment of the invention. At 110, the processor receives a cache miss from the cache. The processor retrieves the desired information from the main memory over a system bus at 111 and checks to see if all the ways in the appropriate set in the cache are occupied at 113. If all the ways in the set are not occupied, the processor stores the information in the cache at 114. If all the ways in the set are occupied, at 116 the eviction logic selects information to be evicted from the cache to make room for the new information. In other embodiments, the new information may be stored in any part of the cache or may be located in the cache using other methodologies. At 117, the eviction logic determines if the information selected for eviction is in the area of the cache that contains the information being secured. If not, the information is evicted at 118 and the new information is stored in the cache at 119. In one embodiment, when the information is in the protected area the eviction logic checks to see if cache protection is enabled at 120 and, if not, the information is evicted at 118 and the new information is stored in the cache at 119. If cache protection is enabled, the eviction logic selects new information to be evicted at 116. The eviction logic will continue to select new information until it selects information not in the protected area. In an alternate embodiment, the eviction logic could select new information to be evicted without checking to see if cache protection is enabled.

Figure 5:
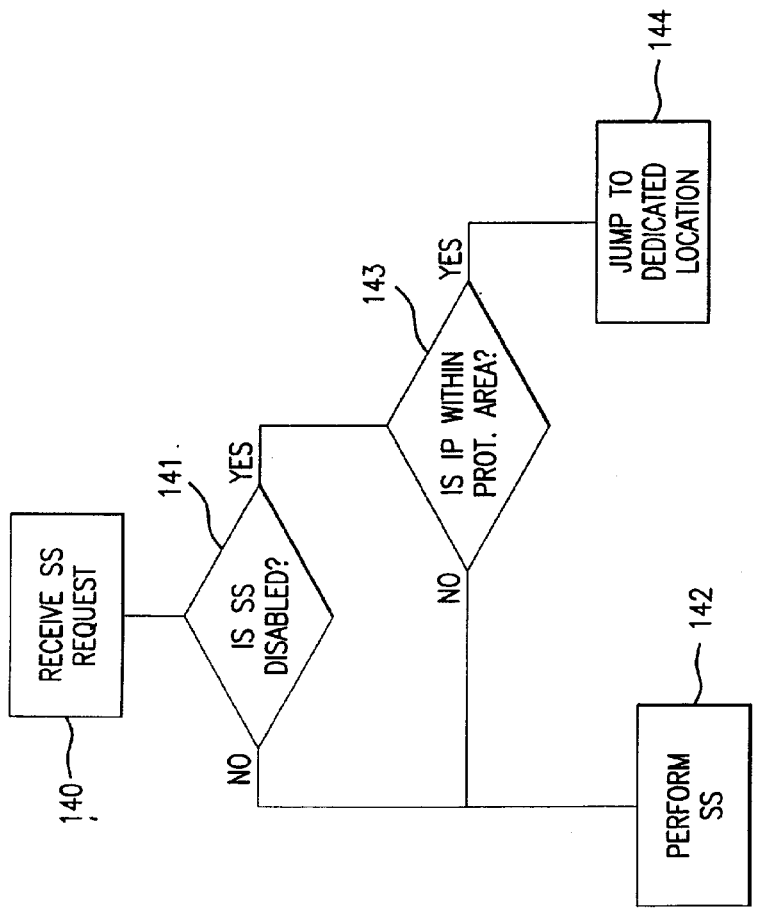
FIG. 5 shows a method of disabling single-stepping according to one embodiment of the present invention.
Figure 7:
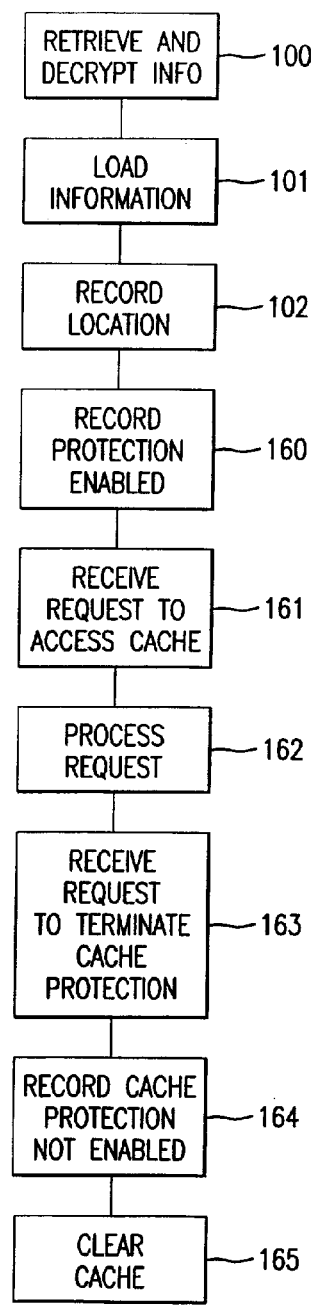

FIG. 5 shows a method of disabling single-stepping according to one embodiment of the present invention. At 140, a request for single-stepping is received. At 141, the single-stepping disabled logic checks to see if single-stepping is disabled. If single-stepping is not disabled, then at 142 the single-stepping is performed. If single-stepping is disabled, then at 143 the single-step disabled logic checks to see if the instruction pointer is pointing to an instruction that will attempt to access an area of the cache that contains information being secured. If the instruction pointer is not pointing to such an instruction, then at 142 the single-stepping is performed. If it is pointing to such an instruction, then at 144 control jumps to a dedicated location which continues the normal execution cycle without going into single-step mode.

Figure 6:
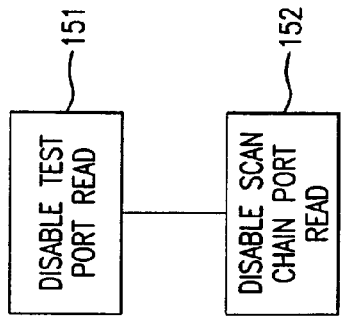
FIG. 6 shows a method of disabling test port reading and scan chain port reading according to one embodiment of the present invention.

FIG. 6 shows a method of disabling test port reading and scan chain port reading according to one embodiment of the present invention. Test port reading and scan chain port reading are disabled once after the processor has been debugged and prior to making the processor available to users. At 151, test port reading is disabled by setting a test port read disable element. At 152, scan chain port reading is disabled by setting a scan chain port disable element. A person of ordinary skill in the art will appreciate that test port reading may be disabled without disabling scan chain port reading, and vice-versa.

Figure 7:
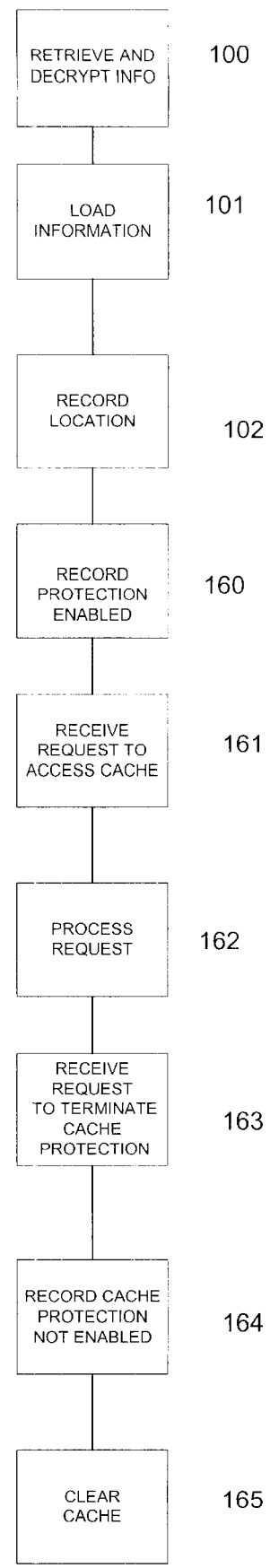
FIG. 7 shows a method of clearing information from the protected area of the cache according to one embodiment of the present invention.
Figure 1:
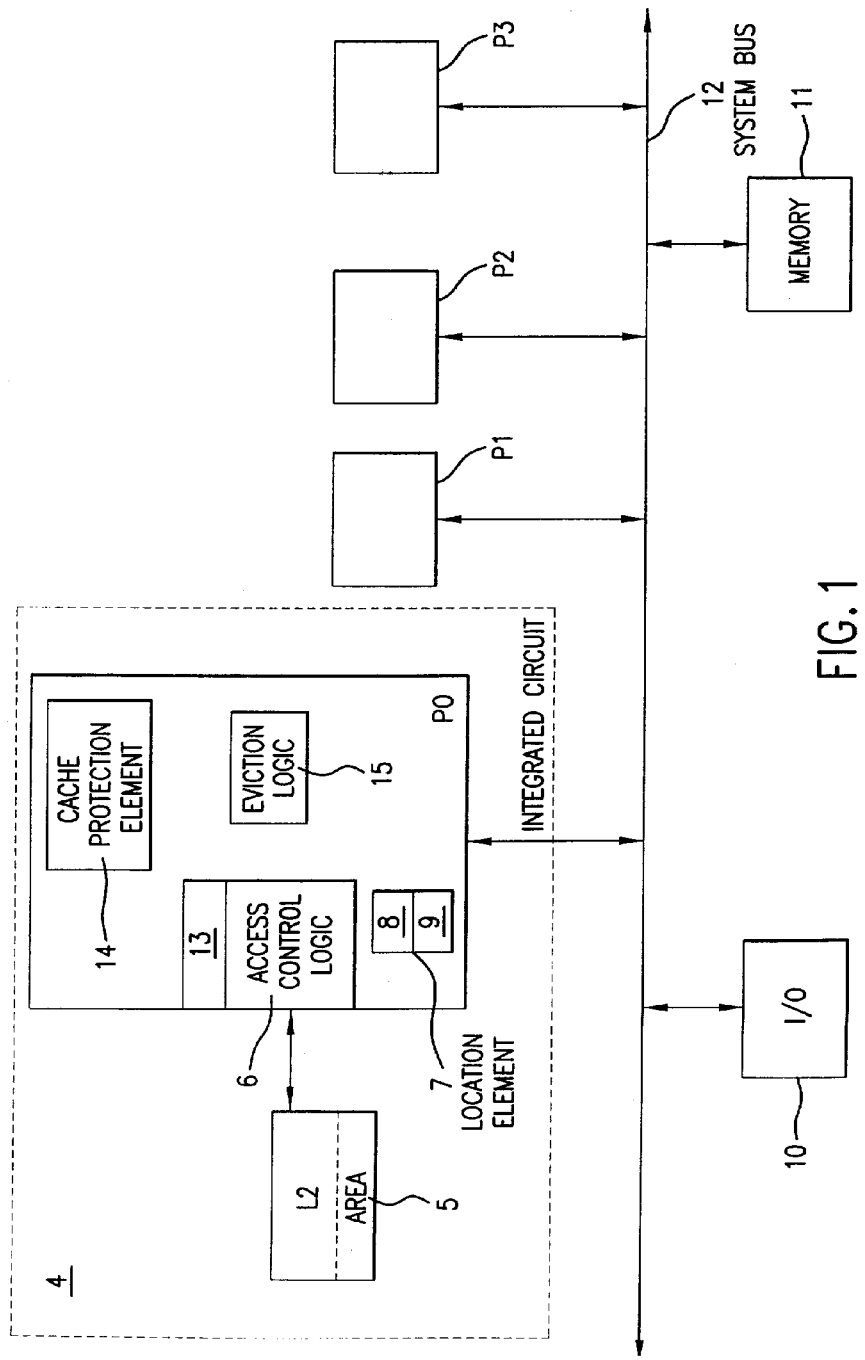
Figure 2:
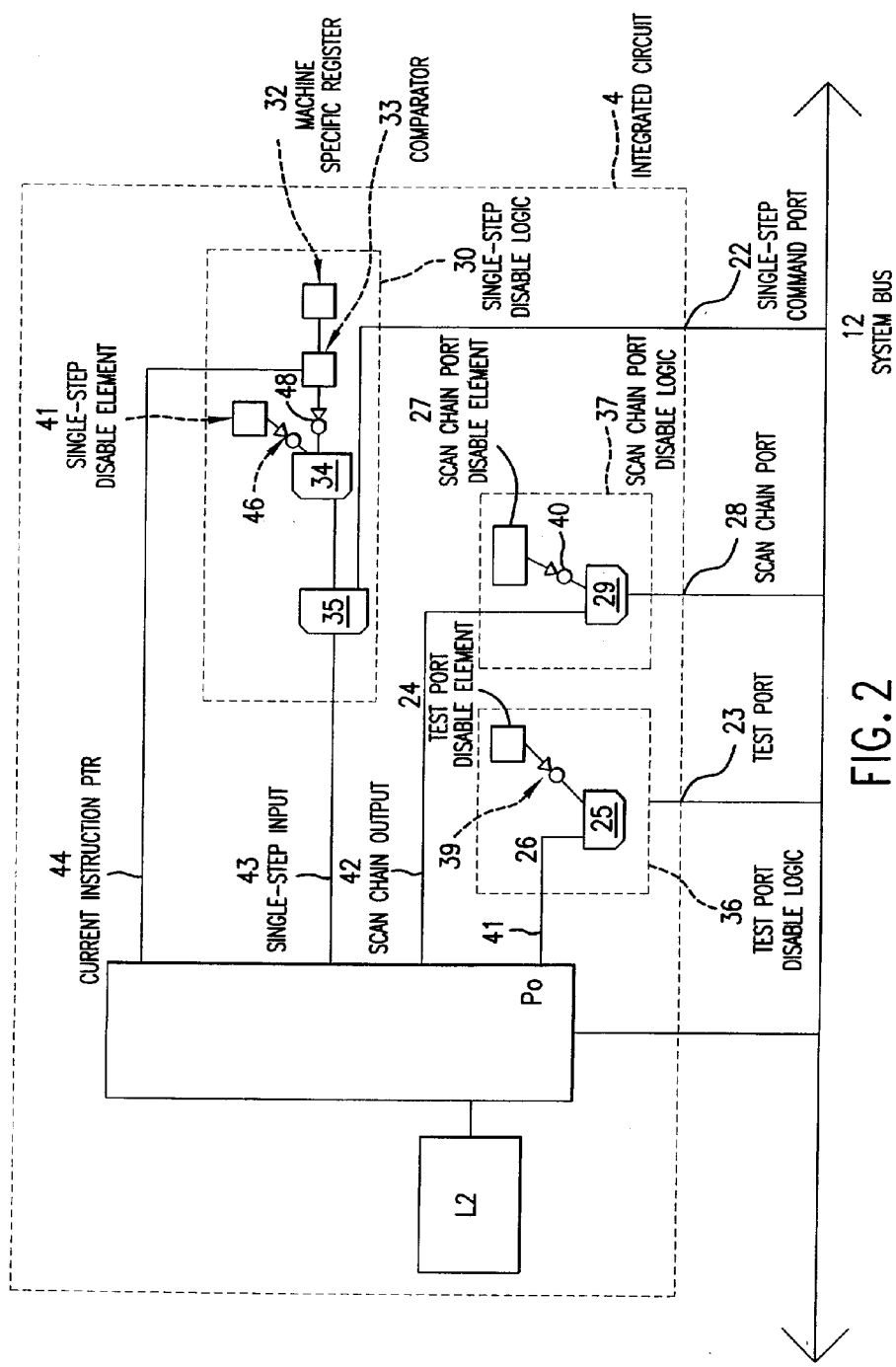

FIG. 7 shows a method of disabling cache protection and clearing information from the protected area according to one embodiment of the present invention. At 100, the processor retrieves encrypted information, for example from the system memory or from the system firmware area, and decrypts the information. This information will be secured in the cache. The processor loads information into an area of the cache at 101 and records the location in the cache of the information being secured at 102 (just as in FIG. 3). At 160 of FIG. 2, the processor records that cache protection is enabled. The processor receives a request to access the cache at 161 and processes the request at 162. The request is processed at 162 according to the procedure shown at 104–108 of FIG. 3. At 163 of FIG. 7, the processor receives a request to terminate cache protection. The processor then records that cache protection is not enabled at 164 and clears the cache at 165. Since cache protection is now disabled, it is important to clear the cache to prevent unauthorized users from gaining access to information that was being secured.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, although embodiments disclosed provide disabling of test port read, scan chain read, and single-stepping using hardware devices, these aspects of the present invention can be implemented using software. In addition, while in one embodiment all the different aspects of the invention (e.g., preventing snoops, preventing eviction from the protected area of the cache, disabling of test port read, disabling scan chain read, disabling single-stepping) should be combined together, any sub-combination of them may also be used.

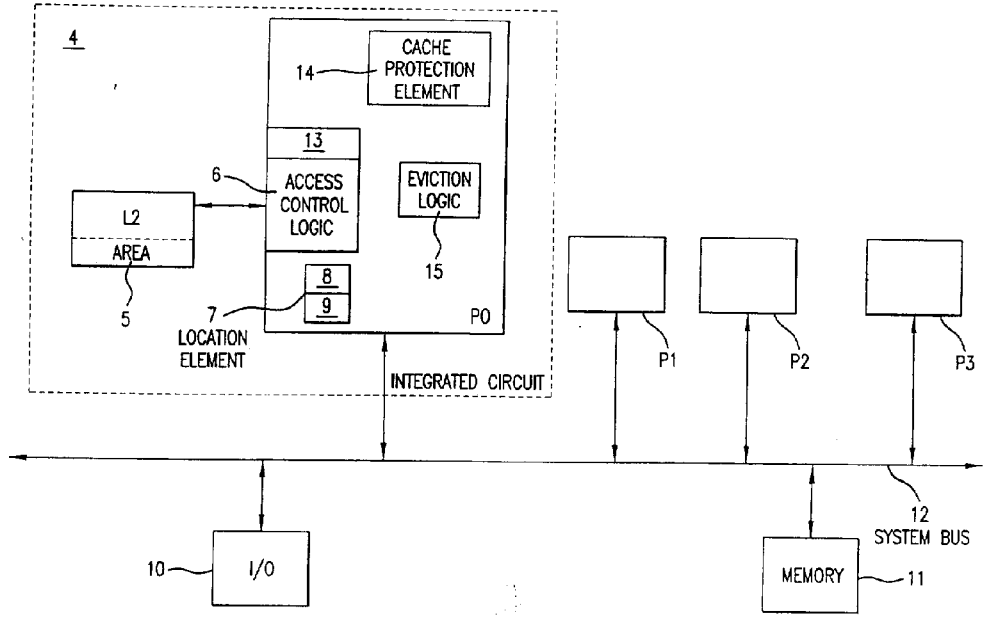

What is claimed is:

1. A method for securing information in a cache that is associated with a processor, comprising:

recording the location in the cache containing information being secured;

determining for each attempted access to the cache by the processor if an instruction is attempting to access the area of the cache containing the information being secured;

when the attempted access is an instruction fetch, performing the instruction fetch; and when an instruction is attempting to access the area of the cache containing the information being secured, performing a cache avoidance procedure instead of allowing the instruction to access the area of the cache containing the information being secured.

2. The method of claim 1, wherein the cache avoidance procedure comprises permitting the instruction to access another memory instead of the cache.

3. The method of claim 1, wherein the cache avoidance procedure comprises indicating that an error has occurred.

4. The method of claim 1, further comprising:

determining for each attempted access to the cache by a second processor not associated with the cache whether an instruction is attempting to access the area of the cache containing the information being secured; and when the attempted access by said second processor is an instruction attempting to access the area of the cache containing the information being secured, performing a cache avoidance procedure instead of allowing the instruction to access the area of the cache containing the information being secured.

5. The method of claim 1, further comprising:

when selecting data to be evicted from the cache, selecting information that is not in the area containing the information being secured.

6. The method of claim 1, further comprising: determining when the instruction was retrieved from the area containing the information being secured before executing an instruction in single-step mode; and executing the instruction in single-step mode only when it was not fetched from the area containing the information being secured.

7. The method of claim 1, further comprising:

when the circuit in which the cache resides has a test port, disabling test port read so that data cannot be read from the test port.

8. The method of claim 1, further comprising:
when the circuit in which the cache resides has scan chain access, disabling scan chain access so that data cannot be read from the scan chain.

9. A method for securing information in a cache that is associated with a processor, comprising:
recording the location in the cache containing information being secured;
determining for each attempted access to the cache by the processor if an instruction is attempting to access the area of the cache containing the information being secured and if cache protection is enabled;
when the attempted access is an instruction fetch, performing the instruction fetch;
when an instruction is attempting to access the area of the cache containing the information being secured and cache protection is enabled, performing a cache avoidance procedure instead of allowing the instruction to access the area of the cache containing the information being secured; and
when an instruction is attempting to access the area of the cache containing the information being secured and cache protection is not enabled, performing the instruction.

10. The method of claim 9, further comprising:
when the information is no longer needed by the processor, recording that cache protection is not enabled and clearing the area in the cache containing the information being secured.

11. The method of claim 9, further comprising selecting information not in the area containing the information being secured when selecting data to be evicted from the cache and cache protection is enabled.

12. An apparatus for securing information in a cache comprising:
a processor;
a cache;
a location element to record a location in the cache containing information being secured; and
access control logic to prevent access by an instruction executed in the processor to the area of the cache defined by said location element.

13. The apparatus of claim 12, wherein the instruction is a read or write instruction.

14. The apparatus of claim 12, wherein the location element comprises a first location register and second location register to record the locations containing the information being secured, the first location register to store the start address of the information and the second location register to store the size of the information.

15. The apparatus of claim 12, wherein the access control logic further prevents access to the area of the cache defined by said location element by any other processor.

16. The apparatus of claim 12, wherein:
the processor further includes eviction logic to select information to be evicted from the cache; and
the eviction logic is prevented from selecting information from the area of the cache containing the information being secured.

17. The apparatus of claim 12, wherein the apparatus further includes single-step logic to prevent the execution of an instruction in single-step mode when the instruction was fetched from the area of the cache containing the information being secured.

18. The apparatus of claim 12, wherein the apparatus further includes:
a test port;
a test port read disable element; and
logic to disable reading from the test port when the test port read disable element is set.

19. The apparatus of claim 12, wherein the apparatus further includes:
a scan chain port;
a scan chain disable element; and
logic to disable reading from the scan chain port when the scan chain disable element is set.

20. An apparatus for securing information in a cache comprising:
a processor;
a cache;
a secured cache protection enabled element;
a location element to record a location in the cache containing information being secured; and
access control logic to prevent access by an instruction executed in the processor to the area of the cache defined by said location element when the cache protection enabled element is set;
cache protection disable logic to clear the cache protection enabled element and clear the area in the cache containing the information being secured when the information is no longer needed by the processor.

21. The apparatus of claim 20, wherein the processor further includes eviction logic to select information to be evicted from the cache; and
wherein the eviction logic is prevented from selecting information from the area of the cache containing the information being secured when cache protection is enabled.

22. A computer readable medium having stored thereon program instructions that, when executed by a processor, cause the processor to secure information in a cache that is associated with a processor, according to the method of:
recording the location in the cache containing the information being secured;
determining for each subsequent attempted access to the cache by the processor if an instruction is attempting to access the area of the cache containing the information being secured;
when the attempted access is an instruction fetch, performing the instruction fetch; and
when an instruction is attempting to access the area of the cache containing the information being secured, performing a cache avoidance procedure instead of allowing the instruction to access the area of the cache containing the information being secured.

23. The computer readable medium of claim 22, wherein the method further comprises:
determining when the instruction was retrieved from the area containing the information being secured before executing an instruction in single-step mode; and
executing the instruction in single-step mode only when it was not fetched from the area containing the information being secured.

24. The computer readable medium of claim 22, wherein the method further comprises selecting information to be evicted by determining which information is to be evicted without regard to whether it is in the area containing the information being secure when cache protection is not enabled.

25. A computer system comprising:

a memory;

a processor;

a cache coupled to said processor;

said processor having at least one register to record a location in the cache containing information being secured; and said processor having access control logic to prevent access by an instruction executed in the processor to the area of the cache defined by said register.

26. The computer system of claim 25, wherein:

said processor further includes eviction logic to select information to be evicted from the cache; and the eviction logic is prevented from selecting information from the area of the cache containing the information being secured.

27. The computer system of claim 25, further including:

a cache protection enabled element that is set when the cache contains information that is being secured; and logic to clear the cache protection enabled element and clear the area in the cache containing the information being secured when the information is no longer needed by the processor.

* * * * *

UNITED STATES PATENT AND TRADEMARK OFFICE
CERTIFICATE OF CORRECTION

PATENT NO.      : 6,397,301 B1
DATED           : May 28, 2002
INVENTOR(S)     : Quach et al.

It is certified that error appears in the above-identified patent and that said Letters Patent is hereby corrected as shown below:

The title page showing an illustrated figure, should be deleted and substituted therefor the attached title page.

Delete drawing sheets 1, 2, 4 and 5 and substitute therefor the attached drawing sheets 1, 2, 4 and 5.

Signed and Sealed this

Second Day of September, 2003

JAMES E. ROGAN
*Director of the United States Patent and Trademark Office*

United States Patent
Quach et al.

(10) Patent No.: US 6,397,301 B1
(45) Date of Patent: May 28, 2002

(54) PREVENTING ACCESS TO SECURE AREA OF A CACHE

(75) Inventors: Nhon T. Quach, San Jose; Gary Hammond, Campbell; Kin-Yip Liu, Santa Clara, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,973

(22) Filed: Dec. 29, 1999

(51) Int. Cl.[7] .............................................. G06F 12/00
(52) U.S. Cl. .................................... 711/138; 711/163
(58) Field of Search ................................. 711/163, 138

(56) References Cited

U.S. PATENT DOCUMENTS

| | | | |
|---|---|---|---|
| 4,357,656 A | * 11/1982 | Saltz et al. | 364/200 |
| 4,740,889 A | * 4/1988 | Motersole et al. | 364/200 |
| 5,210,850 A | * 5/1993 | Kelly et al. | 395/425 |
| 5,224,166 A | * 6/1993 | Hartman, Jr. | 380/50 |
| 5,247,639 A | * 9/1993 | Yamahata | 395/425 |
| 5,408,636 A | * 4/1995 | Santeler | 395/425 |
| 5,551,004 A | * 8/1996 | McClure | 395/465 |
| 5,586,293 A | * 12/1996 | Baron et al. | 395/445 |
| 5,724,550 A | * 3/1998 | Stevens | 395/473 |
| 5,761,719 A | * 6/1998 | Mahin et al. | 711/139 |
| 5,900,014 A | * 5/1999 | Bennett | 711/138 |
| 6,044,478 A | * 3/2000 | Green | 714/42 |
| 6,131,155 A | * 10/2000 | Alexander et al. | 712/207 |
| 6,138,216 A | * 10/2000 | Harvey | 711/139 |

* cited by examiner

*Primary Examiner*—Kevin Verbrugge
(74) *Attorney, Agent, or Firm*—Kenyon & Kenyon

(57) ABSTRACT

Information in a cache that is coupled to a processor is secured by recording the location in the cache of information that is being secured, and performing a cache avoidance procedure instead of allowing the instruction to access the area of the cache containing the information being secured.

27 Claims, 5 Drawing Sheets